United States Patent

Nagano

[11] Patent Number: 5,806,379
[45] Date of Patent: Sep. 15, 1998

[54] BICYCLE PEDAL SYSTEM HAVING VARIABLE TREAD SURFACES

[75] Inventor: Masashi Nagano, Izumi, Japan

[73] Assignee: Shimano, Inc., Osaka, Japan

[21] Appl. No.: 517,199

[22] Filed: Aug. 21, 1995

Related U.S. Application Data

[63] Continuation of Ser. No. 123,884, Sep. 7, 1993, abandoned, which is a continuation of Ser. No. 886,095, May 21, 1992, abandoned.

[30] Foreign Application Priority Data

May 30, 1991 [JP] Japan .................................. 3-127077
Jun. 19, 1991 [JP] Japan .................................. 3-147018

[51] Int. Cl.⁶ .................................................. G05G 1/14
[52] U.S. Cl. ........................... 74/594.6; 74/594.4; 36/131
[58] Field of Search .............. 74/594.4, 594.6; 36/131; 280/236, 238, 259, 291

[56] References Cited

U.S. PATENT DOCUMENTS

| 553,797 | 1/1896 | Wall ........................................ 74/594.4 |
| 622,034 | 3/1899 | Barnes ..................................... 74/594.4 |
| 679,043 | 7/1901 | Wirtz ....................................... 74/594.4 |
| 973,065 | 10/1910 | Pawsat et al. .......................... 74/594.4 |
| 2,751,797 | 6/1956 | Pearl ........................................ 74/594.4 |
| 3,964,343 | 6/1976 | Lauterbach ........................ 74/594.4 X |
| 4,089,236 | 5/1978 | Genzling ................................. 74/594.4 |
| 4,599,915 | 7/1986 | Hlavac et al. .......................... 74/594.4 |
| 4,622,863 | 11/1986 | Denker ................................... 74/594.4 |
| 4,836,047 | 6/1989 | Alcamo ................................. 36/131 X |
| 4,864,887 | 9/1989 | Rapisarda ............................. 36/131 X |
| 4,942,778 | 7/1990 | Bryne ................................. 74/594.4 X |
| 5,284,066 | 2/1994 | Weiss ..................................... 74/594.6 |
| 5,381,708 | 1/1995 | Liao .................................. D36/131 X |
| 5,398,570 | 3/1995 | Chae ...................................... 74/594.4 |

FOREIGN PATENT DOCUMENTS

| 428140 | 5/1991 | European Pat. Off. .............. 74/594.6 |
| 3414971 | 10/1985 | Germany ............................... 74/594.6 |
| 3424759 | 1/1986 | Germany ............................... 74/594.6 |
| 3728015 | 3/1989 | Germany ............................... 74/594.4 |
| 77 | of 1884 | United Kingdom ................ 74/594.4 |
| 88/04802 | 6/1988 | WIPO .................................... 74/594.4 |
| WO89/02625 | 3/1989 | WIPO .................................... 74/594.4 |

*Primary Examiner*—Vinh T. Luong

[57] ABSTRACT

A bicycle pedal system with adaptable pedal tread surfaces includes a pedal (3) having a first tread surface (4) and an adapter (5) attachable to the first tread surface. The adapter defines a second tread surface (7) opposite to a surface thereof facing the first tread surface when the adapter is attached to the first tread surface. The first and second tread surfaces provide different use modes. The first tread surface (4) includes a cleat engaging device (4a) for engaging a cleat, and the second tread surface (7) defines an antislip device (16) suited to treading by a shoe. In an alternative pedal system, the first tread surface (14) defines an antislip device (16) suited to treading by a shoe, and the second tread surface (19) includes a cleat engaging device (20, 21).

8 Claims, 4 Drawing Sheets

BICYCLE PEDAL SYSTEM HAVING VARIABLE TREAD SURFACES

This application is a continuation, of application Ser. No. 08/123,884, filed Sep. 7, 1993, now abandoned, which application is a continuation of application Serial No. 07/886,095 filed May 21, 1992, now abandoned.

BACKGROUND OF THE INVENTION

1. Field of the Invention the present invention relates to a bicycle pedal system having tread surfaces adaptable to cleat shoes and ordinary shoes.

2. Description of the Related Art

Conventionally, when the cyclist wears shoes with cleats attached thereto for pedaling a bicycle, pedals having tread surfaces with cleat engaging devices are attached to the crankset. When the cyclist wears ordinary shoes without cleats for pedaling the bicycle, pedals having antislip devices instead of the cleat engaging devices are attached to the crankset since ordinary shoes tend to slip on the pedals for engaging cleats.

Thus, depending on the types of shoes worn by the cyclist, the different types of pedals are selectively used.

Where the above two types of shoes are selectively worn, it is necessary to have the two types of pedals available and to attach an appropriate type of pedals to the crankset. This forces a waste of time and money on the cyclist.

SUMMARY OF THE INVENTION

The object of the present invention is to provide a novel pedal system for allowing the cyclist to use cleat shoes and ordinary shoes selectively without wasting time and money.

The above object is fulfilled, according to the present invention, by a bicycle pedal system with adaptable pedal tread surfaces comprising a pedal having a first tread surface, and an adapter attachable to the first tread surface, the adapter defining a second tread surface opposite to a surface thereof facing the first tread surface when the adapter is attached to the first tread surface, the first and second tread surfaces providing different use modes.

The first tread surface may include a cleat engaging device for engaging a cleat, while the second tread surface may define an antislip device suited to treading by a shoe. Conversely, the first tread surface may define an antislip device suited to treading by a shoe, while the second tread surface may include a cleat engaging device.

As noted above, an adapter for ordinary shoes is provided for the cleat shoe pedal. Conversely, an adapter for cleat shoes is provided for the ordinary shoe pedal. This simple provision allows the cyclist to select the tread surface formed on the pedal or the tread surface formed on the adapter according to the type of shoes the cyclist wears. Thus, tread surfaces suited to the different types of shoes are made available to the cyclist. When the cyclist wears cleat shoes, he or she may pedal the bicycle with the shoes fixed to the pedals by means of the cleat engaging devices provided as integral part of the pedals or formed on the pedals by using the adapters. When the cyclist wears ordinary shoes, he or she may pedal the bicycle with the shoes placed on the pedals and prevented from slipping thereon by the antislip devices provided as integral part of the pedals or formed on the pedals by using the adapters In the latter instance, the cyclist can freely remove his or her feet from the pedal when necessary.

The present invention provides one type of pedal, i.e. the cleat shoe pedal or ordinary shoe pedal, and one adapter for this pedal. Whichever of the cleat shoe or ordinary shoe is selected, the cyclist can obtain a tread surface suited to the shoe. This is more economical than where the two types of pedals are provided.

Moreover, the adapter may be detachably secured to the pedal through a simple mounting structure compared with the case of interchanging pedals. The pedal specification may be altered relatively easily to accommodate change of shoes used.

Other features and advantages of the present invention will be apparent from the description of the preferred embodiments to be had with reference to the drawings.

DETAILED DESCRIPTION OF THE PREFERRED EMBODIMENTS

Figure 1:
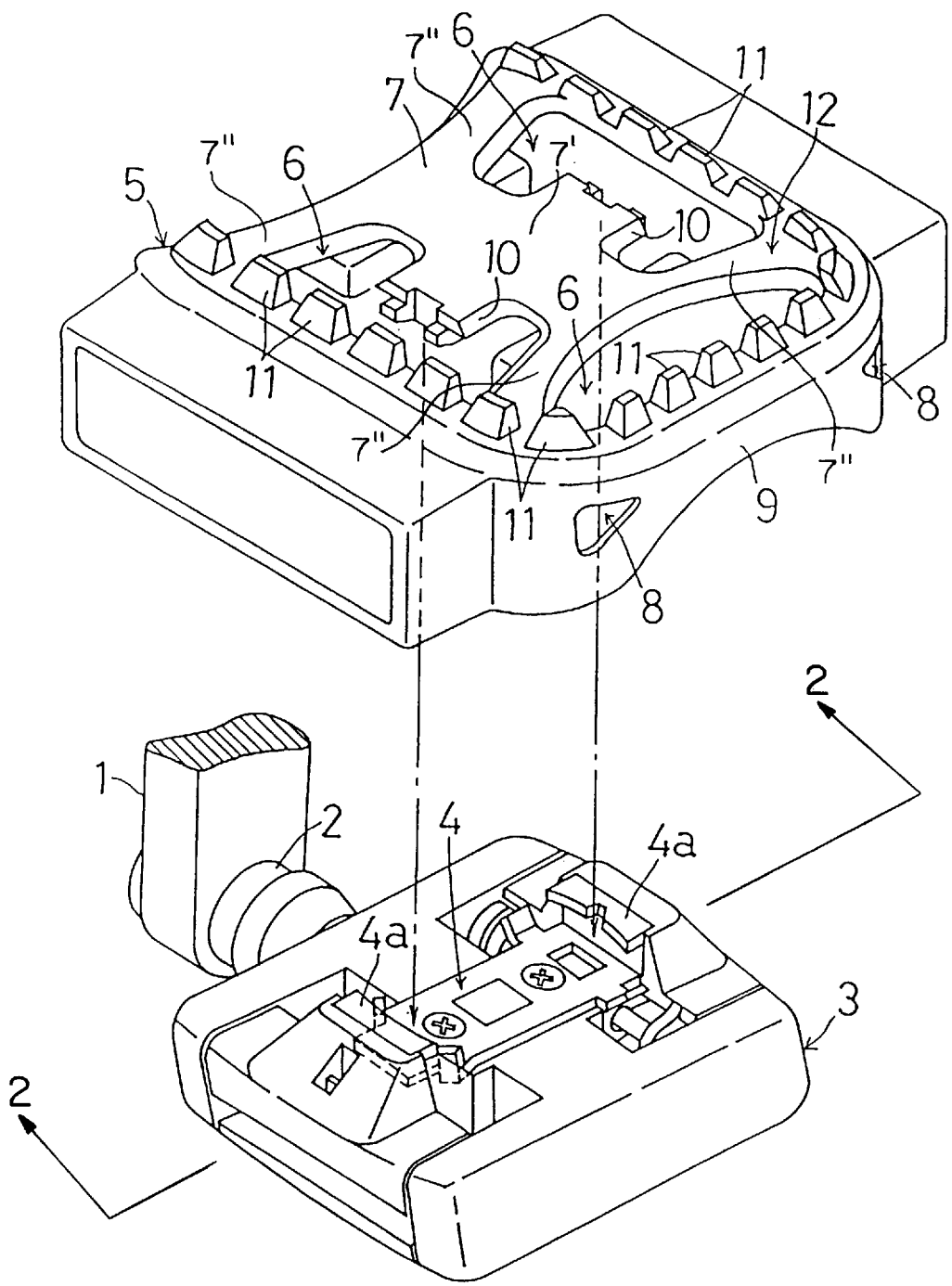
FIG. 1 is a perspective view showing a relationship between a pedal for a cleat shoe used in a pedal system according to the present invention and an adapter attachable to the pedal.

FIG. 1 shows a pedal for a cleat shoe used in a pedal system according to the present invention and an adapter attachable to the pedal. As shown, a bicycle crank arm 1 rotatably supports a pedal body 3 through a pedal shaft 2. The pedal body 3 has opposite tread surfaces. Each tread surface includes a cleat coupling device 4 having a pair of cleat engaging metal hooks 4a disposed in a forward region and a rearward region thereof. Each of the two hooks 4a is pivotable between a lock position and a release position and biased to the lock position by a lock spring (not shown). This construction allows the cyclist to ride the bicycle with each shoe fixed to the pedal through a cleat. As is well known, the shoe is fixed to the pedal by depressing the cleat, and released from the pedal by displacing the cleat relative to the pedal.

Figure 2:
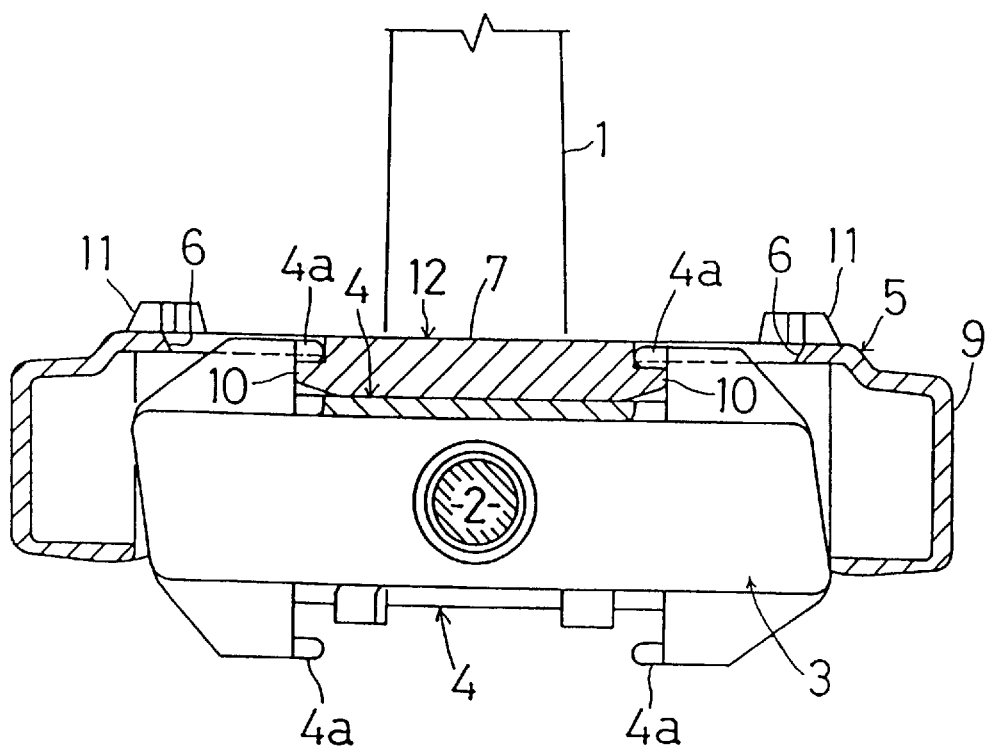
FIG. 2 is a sectional view of the adapter mounted on the pedal as indicated by line 2—2 shown in FIG. 1.

As shown in FIGS. 1 and 2, the cleat engaging hooks 4a may be used as an adapter coupling device for detachably securing an adapter 5 to the tread surface of the pedal. This adapter 5 includes a tread surface suited to an ordinary shoe as described later. With the adapter 5 mounted in position, the pedal is converted to a pedal suitable to an ordinary shoe without a cleat and capable of preventing slips of the shoe.

As shown in FIG. 1, the adapter 5 has a main adapter body formed of plastics and including an upper plate portion 7 defining, by an H-shaped bridge member 7', a plurality of perforations (through holes) 6, and a skirt portion 9 defining a plurality of perforations 8. The upper plate portion 7 includes a pair of couplings (adapter engaging portions) 10 formed respectively on central edge portions thereof for connection to the cleat engaging hooks 4a, and a multiplicity of projections 11 arranged peripherally of the upper plate portion 7. The upper plate portion 7 also includes connecting portions 7" between the bridge member 7' and the outer surface 12.

As shown in FIG. 2, the adapter body is formed as a case for covering one of the tread surfaces of the pedal body 3."

When the adapter body is placed on the pedal body 3, the couplings 10 in their approach to the cleat engaging hooks 4a cause the hooks 4a to pivot in releasing directions. Subsequently, the lock springs (not shown) cause the hooks 4a to return to the lock positions for engaging the couplings 10, respectively. The entire adapter is thereby secured to the pedal body 3 not to be readily releasable. With the skirt portion 9 surrounding and contacting sides of the pedal body 3, the adapter 5 is not movable relative to the pedal body 3 along the tread surface. Once the adapter 5 is mounted on the pedal, an outer surface 12 of the upper plate portion 7 acts as a shoe receiving tread surface lying above the cleat coupling device 4 on the tread surface of the pedal on which the adapter 5 is mounted. In this state, the projections 11 of the outer surface 12 act as an antislip device.

The entire adapter 5 is releasable from the pedal by disengaging the couplings 10 of the adapter body from the cleat engaging hooks 4a through movement similar to the well known operation to release the cleat from the pedal.

Figure 3:
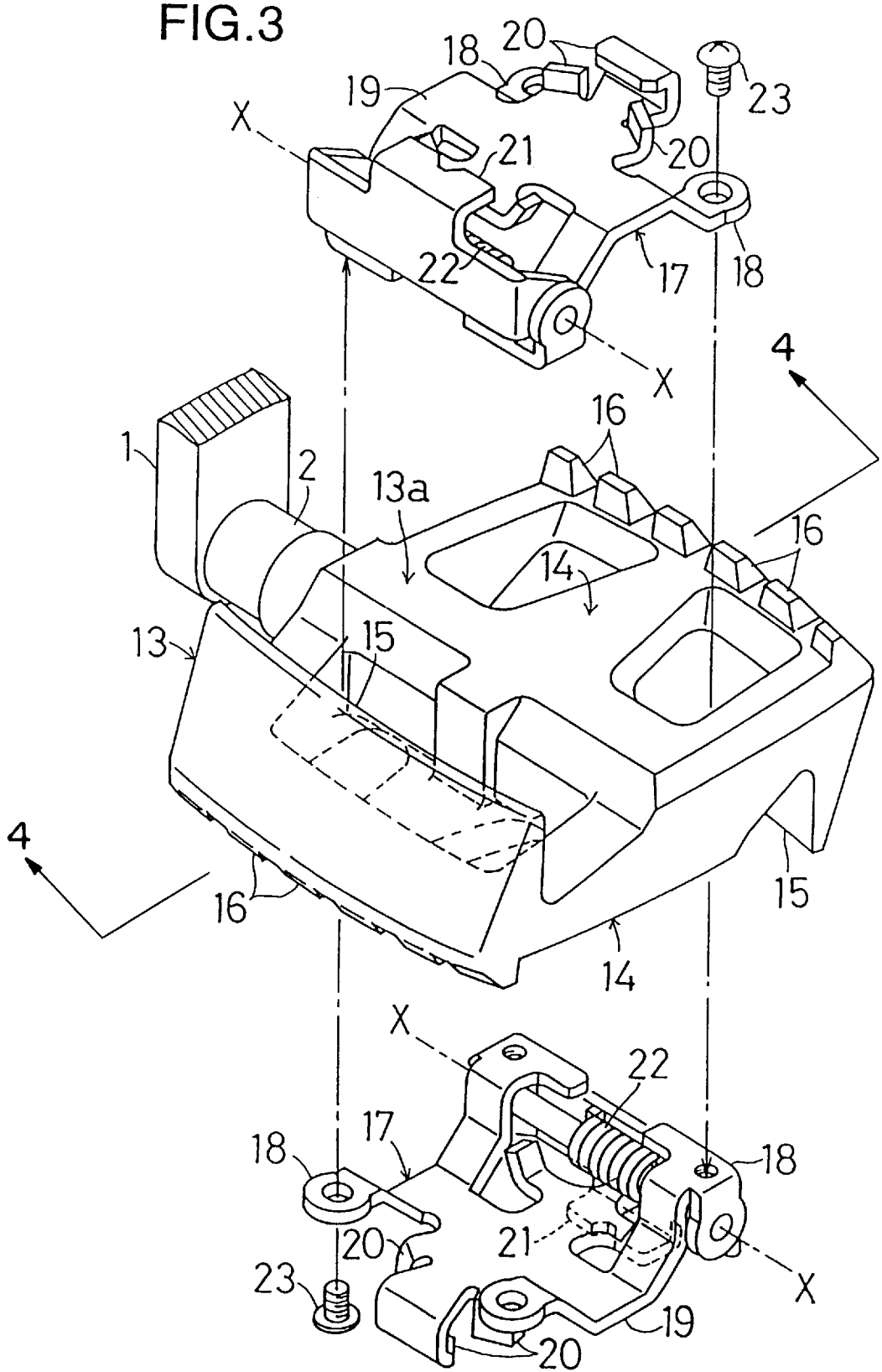
FIG. 3 is a perspective view showing a relationship between a pedal for an ordinary shoe used in the pedal system according to the present invention and an adapter attachable to this pedal.

FIG. 3 shows a pedal for an ordinary shoe used in a pedal system according to the present invention and an adapter attachable to this pedal. As shown, a bicycle crank arm 1 rotatably supports a pedal body 13 through a pedal shaft 2. The pedal body 3 has opposite tread surfaces 14. Each tread surface 14 includes an antislip ridge 15 and antislip projections 16 defined on a pedal frame. This construction allows the cyclist to pedal the bicycle with each ordinary shoe without a cleat placed on the tread surface 14 free from slips.

Figure 4:
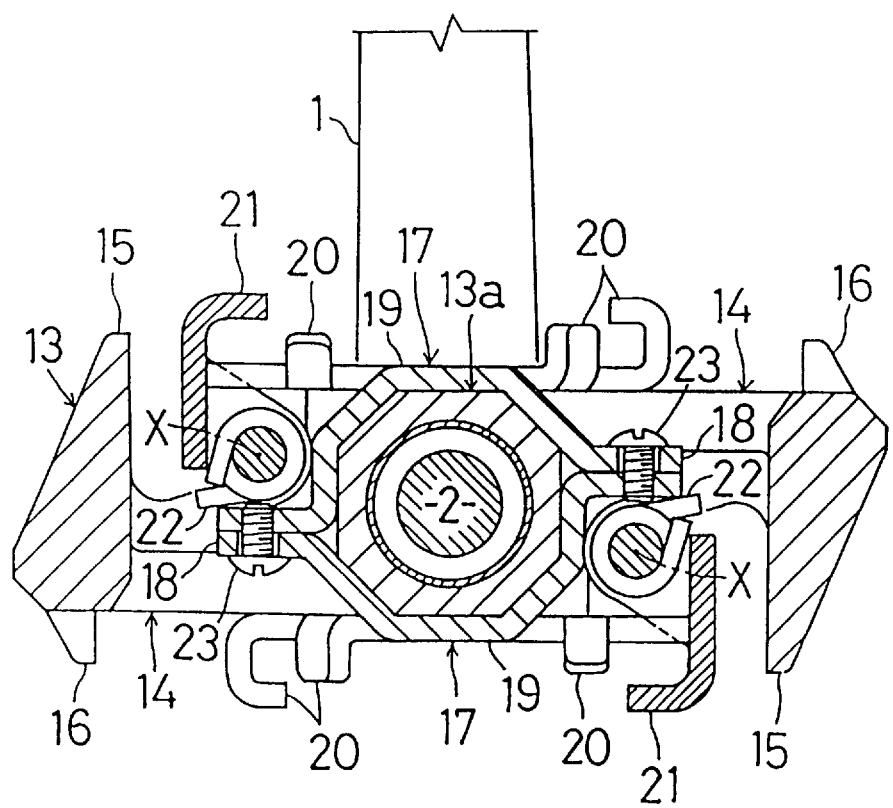
FIG. 4 is a sectional view of the adapter shown in FIG. 3.

As shown in FIG. 4, the pedal body 13 has a shaft connecting portion 13a available for use as an adapter mount for detachably securing an adapter 17 to the pedal body 13. The adapter 17 defines cleat receiving tread surfaces as described later. With the adapter 17 mounted in position, the pedal is converted to a pedal suitable for securing a shoe with a cleat.

As shown in FIG. 3, the adapter 17 has main adapter bodies 19 formed of sheet metal and each including a pair of couplings 18. Each adapter body 19 further includes a fixed engaging claw 20 and a movable engaging claw 21. The claw 21 is pivotable about an axis X between a lock position and a release position and biased to the lock position by a spring 22.

As shown in FIG. 4, the couplings 18 of the adapter body 19 placed on one tread surface 14 of the pedal body 13 are rigidly connected by mounting screws 23 to the couplings 18 of the adapter body 19 placed on the other tread surface 14. Thus, the couplings 18 of the two adapter bodies 19 immovably fix the adapter 17 to the pedal body 13, with the shaft connecting portion 13a of the pedal body 13 sandwiched in between.

Once the adapter 17 is mounted on the pedal, each pair of fixed cleat engaging claw 20 and movable cleat engaging claw 21 are opposed to one another across the tread surface 14.

The adapter 17 is detachable from the pedal by removing the mounting screws 23 to disconnect the adapter bodies 19.

In each of the foregoing embodiments, the cleat coupling device or the shaft connecting portion is used also as an adapter mount for allowing attachment of the adapter to the pedal body. This attaching structure or connecting mode is of course variable. For example, the adapter may be screwed to a mounting seat.

What is claimed is:

1. An adapter for adapting a pedal for use with a cleated shoe to a use with an uncleated shoe, the pedal including a pedal body, a first and a second cleat engaging portion for engaging with a front and a rear engaging portion of a cleat respectively, and at least one of the first and second cleat portions being pivotally supported on the pedal body so that the cleat can be attached to or released from the pedal, said adapter comprising:

an upper plate portion;

a first adapter engaging portion provided on said upper plate portion and extending forwardly of said adapter;

a second adapter engaging portion provided on said upper plate portion and extending rearwardly of said adapter, wherein said first adapter engaging portion and said second adapter engaging portion engage with the first and second cleat engaging portions respectively when said adapter is attached to the pedal;

a first portion of said upper plate portion surrounding at least a part of said first adapter engaging portion, said first portion and said first adapter engaging portion defining a first perforation therebetween;

a second portion of said upper plate portion surrounding at least a part of said second adapter engaging portion, said second portion and said second adapter engaging portion defining a second perforation therebetween;

a tread surface formed on said upper plate portion for contact with the uncleated shoe; and further comprising a skirt portion extending downwardly from nearby said tread surface.

2. An adapter as claimed in claim 1, further comprising a bridge member connecting said first and second adapter engaging portions with said tread surface.

3. An adapter as claimed in claim 2, wherein said bridge member is a plate extending substantially in a horizontal direction and having an H-like configuration, and said first and second adapter engaging portions extend to a front and a rear direction from a central edge portion of said H-like configuration.

4. A bicycle pedal adapter for conforming a cleated bicycle pedal for use with a non-cleated shoe, comprising:

an upper plate forming a first cleat coupling on a front end of the adapter and a second cleat coupling on a rear end of the adapter, an antislip portion integrally formed with the upper plate, and further comprising a skirt portion extending downwardly from a peripheral position of the upper plate.

5. The bicycle pedal adapter of claim 4, wherein the antislip portion comprises a tread surface.

6. The bicycle pedal adapter of claim 4, wherein the antislip portion comprises a plurality of projections formed on a periphery of the upper plate.

7. The bicycle pedal adapter of claim 4, wherein the upper plate forms a first opening around the first cleat coupling and a second opening around the second cleat coupling, wherein the first and second openings are structured to accept cleat engaging hooks from a cleat pedal.

8. The bicycle pedal adapter of claim 4, wherein said upper plate provides a plurality of through holes between the first and second couplings and the skirt portion.

* * * * *